Patented Sept. 22, 1936

2,055,120

UNITED STATES PATENT OFFICE 2,055,120

PROCESS OF CANNING RICE

Takanoshin Domoto, Oakland, Calif.

No Drawing. Application October 27, 1934,
Serial No. 750,351

2 Claims. (Cl. 99—186)

This invention relates to a process of canning rice.

One of the objects of the invention is the provision of a process wherein precooked rice is canned and none of the qualities of the fresh rice are lost. Another aim of the invention is the provision of a process by which the appearance of freshly cooked rice is not sacrificed, no matter how long the product may remain in the container before being consumed.

Still another object of the invention is the provision of a process in which rice may be canned in an economical way and without the necessity of employing extra equipment in addition to that maintained in the ordinary establishment wherein other foods are processed.

The canning of rice has long been one of the food industries most perplexing problems, and notwithstanding the expenditure of vast sums of money by the industry in research and experimentation, to date no satisfactory process has been devised. In fact, one foreign government, the principal diet of whose subjects is rice, some years ago offered a substantial sum for the disclosure of a process which would satisfactorily can rice, and subsequently withdrew the offer for the reason that although many disclosures had been made, none of them attained the desired object.

One of the principal difficulties encountered by those who have experimented with this subject has been the fact that after the rice has been canned, it loses all of the appearance of the freshly cooked product, in much the same manner as oysters did in the early days of the canning of that particular type of food. In the canning of oysters, it was originally found that before any appreciable amount of time had elapsed after processing, the oysters were reduced to a lumpy mass and were thus rendered unsightly and unpalatable as well. Experiments in the canning of rice have shown a similar result. In the treatment of the latter product by the employment of many of the known canning steps, it was found that the rice had a tendency to congeal into lumps and thus become an unsightly mass within the can, while at the same time losing the desirable taste and flavor of freshly cooked rice.

In perfecting the process about to be described, it is believed that I have overcome the obstacles which heretofore have been in the path of successful canning of rice.

It should be understood and appreciated that in order to obtain my objective I do not employ any special type of rice, or rice which has received any unique treatment in anticipation of canning, but employ the ordinary standard commercial cooking rice, such as the housewife would purchase from a grocery store.

The first step in my process consists in the placing of rice in a vessel with an ample supply of water and the bringing of this mixture to a boiling point, ranging from 180° to 212° F. As soon as the boiling point has been reached, I gradually decrease the temperature by cutting down the flame beneath the vessel, until the water within the vessel is completely evaporated, at which point the rice is removed from the vessel in anticipation of the next step.

The second step in my process consists of the artificial cooling of the cooked rice, bringing the temperature down to approximately 37° Fahrenheit. The purpose of this cooling step is to dispel gases which would be present at the higher temperature, and also with the idea in mind of beginning the suspension of bacterial activity in the cooked rice.

The third step in my process consists in the charging of cans with the cooked and cooled rice, the said cans being then capped with a vented lid.

The fourth step consists in the creation of a vacuum within the can by any of the known mechanical means and then the sealing of the aforementioned vents to maintain the vacuum within the tins.

It is important to note that what is generally known in the trade as "exhausting" of a canned food product is rendered unnecessary in the present process. Further that cooking of any kind, after the precooked rice has been canned, is unnecessary, the condition of the rice at the time of canning and the vacuum subsequently created combining to prevent fermentation or decomposition, inasmuch as any activity of bacteria within the tin is completely suspended.

My experiments in the canning of rice according to the formula of this process have been completely satisfactory and have indicated that rice so prepared may be kept indefinitely in a perfect state of preservation.

The vacuum found necessary in the packing of rice according to my process averages around .25.

While the foregoing specification has described the invention as being particularly applicable to the canning of rice, it will be appreciated that it may be successfully practiced in connection with other foods having similar properties, and therefore I do not wish to be confined to that specific commodity but to enjoy protection according to the scope of the appended claims.

Having thus described my invention, what I claim and desire now to secure by grant of Letters Patent is:

1. A process of canning rice which consists in immersing dry rice in a quantity of water within a vessel, bringing the mixture within the vessel to a boiling point, gradually reducing the temperature from the boiling point until all free liquids within the vessel are evaporated, then artificially chilling the rice to approximately 37° Fahrenheit, next charging cans with the product thus prepared and then creating a vacuum within said cans.

2. A process of canning rice which consists in immersing dry rice in a quantity of water within a vessel, bringing the mixture within the vessel to a boiling point, gradually reducing the heat applied thereto until all free liquids within the vessel are evaporated, then artificially chilling the rice to approximately 37° Fahrenheit, next charging cans with the product thus prepared and then creating a vacuum within said cans.

TAKANOSHIN DOMOTO.